June 17, 1952     G. A. LYON     2,601,209
WHEEL COVER
Filed Oct. 15, 1948
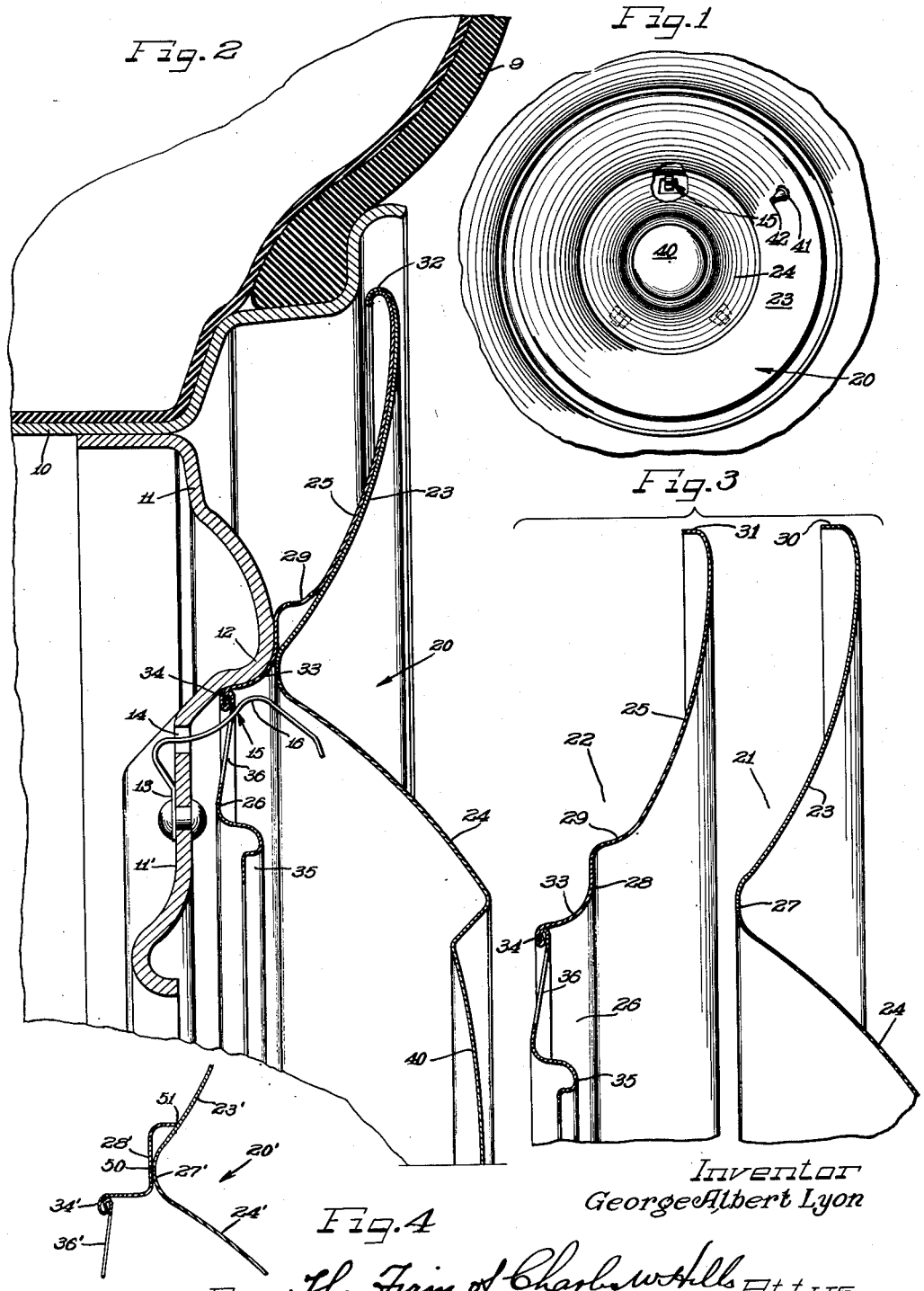
Inventor
George Albert Lyon
By The Firm of Charles W Hills Attys Patented June 17, 1952

2,601,209

UNITED STATES PATENT OFFICE 2,601,209

WHEEL COVER

George Albert Lyon, Detroit, Mich.

Application October 15, 1948, Serial No. 54,699

6 Claims. (Cl. 301—37)

This invention relates to a wheel cover structure and more particularly to an improved cover for an automobile wheel.

An object of this invention is to provide a relatively strong but simple cover to manufacture which readily lends itself to application on an automobile wheel.

Another object of this invention is to provide a cover of a multiple thickness wherein the material is distributed in such a manner that it will be used to greatest advantage in a cover when it is mounted upon a wheel.

In accordance with the general features of this invention there is provided in a cover structure for a wheel including a multi-flanged tire rim and a body part having a plurality of spaced cover retaining spring clips, a cover comprising circular dished elements nested one within the other, the cover including a double thickness outer annular portion extending over the junction of the rim and body parts and terminating radially outwardly opposite the flanged rim, the center portion of the outer of the elements being bulged outwardly into a hub covering portion and the central portion of the inner element being formed into a flange spaced axially from the hub covering portion and provided with a plurality of openings through which the spring clips project and shoulder means engageable by the clips for retaining the cover on the wheel.

Another feature of the invention relates to forming the rear flange or skirt of a cover with a multiple thickness shoulder or seam for rigidifying the cover and which is adapted to bottom against the body part of the wheel when the cover is in retained cooperation with the spring clips.

Other objects and features of this invention will more fully appear from the following detailed description taken in connection with the accompanying drawings which illustrate several embodiments thereof and in which:

Figure 1 is a fragmentary side view of the cover structure embodying the features of this invention and showing a part of the cover broken away to show one of the spring clips;

Figure 2 is an enlarged, fragmentary cross-sectional view taken through the structure of Figure 1 and showing the cover applied to the wheel;

Figure 3 is an exploded view showing the two nested elements, which normally make up the cover, separated from each other but in position to be nested and interlocked together; and Figure 4 is a fragmentary sectional view of a cover showing a modification.

As shown on the drawings:

In Figure 2 I have illustrated a more or less conventional type automobile wheel including the usual pneumatic tire and tube assembly 9 carried upon a multi-flanged drop center type of tire rim 10 which is in turn supported upon a dished body or spider part 11. This body part 11 includes a bulged central nose 12 which terminates in a radial central bolt-on flange 11' by means of which the wheel may be detachably bolted in the usual way to a part on an axle of a vehicle.

Carried by this central flange 11' are a plurality of spring clips 15 spaced circumferentially from each other and which may be of any suitable number such, for example, as 3 to 5. Each of these clips includes a leg 13 riveted or otherwise secured to the inboard side of the flange 11' and projecting through an opening 14 in the flange 11'. The outer or free extremity 16 of each spring clip 15 is humped so as to provide a shoulder over which a portion of the cover must be snapped in order to retain the cover on the wheel.

I have designated my novel sheet metal cover generally by the reference character 20. It is for the most part made up of a multiple thickness or, in other words, comprises two nested sheet metal elements 21 and 22 which are shown separated in Figure 3. Each of these elements comprises a metallic stamping made from any suitable sheet metal. For illustration, the outer element 21 may be made of stainless steel or other metal capable of having a high lustrous finish, whereas the inner element 22 may be made of a cheaper grade of steel.

The element 21 includes an outer convex annular portion 23 and a central crown or hub covering portion 24. The inner element 22 likewise comprises an outer annular convex portion 25 which is adapted to be nested in the portion 23. In addition, the inner element 22 includes a radial flange 26 which is adapted to be located opposite the wheel body flange 11'.

The junction of the two portions 23 and 24 of element 21 is dished at 27 to form a shoulder adapted to bottom on an annular shoulder 28 formed on the other element 22. It will be noted that the element 22 has at the junction of portion 25 and shoulder 28 a drain hole 29 through which water can drain out of the cover when the parts are assembled together.

The outer element 21 has a turned peripheral flange 30 and the inner element 22 has a similar turned flange 31 adapted to nest inside the flange 30 when the two elements are pressed together in a suitable punch press. The flanges 30 and 31 are adapted to be curled one within the other so as to interlock them as shown in Figure 2, thereby providing the cover with a reinforced outer turned peripheral edge 32. This reinforced edge is adapted to be engaged by a pry-off tool in the removal of the cover from the wheel.

When the cover elements 21 and 22 are thus interlocked together the annular shoulder 27 of the outer element 21 rests tightly against the shoulder 28 on the inner element 22 as shown in Figure 2.

Attention is directed to the fact that the shoulder 28 is connected to the flange 26 of the inner element 22 by a curved portion 33 of a configuration such that this portion can tightly nest around the nose 12 of the body part 11 as shown in Figure 2. This enables the cover to be tightly bottomed or seated against the body part and to be self-centering thereon.

In order to further reinforce the seated portion of the cover, I provide the junction of portion 33 and flange 26 with a multiple thickness bead 34 adapted to bear against the body part and positively limit inward axial movement of the cover when it is applied to the wheel. The location of this multiple thickness bead is such that when it is against the body part the outer turned edge 32 of the cover is clear of and spaced from the flanges of the rim part 10.

Furthermore, the flange 26 of the inner cover part 22 is provided with a plurality of apertures 36 corresponding in number to the spring clips 15 and through each of which a free extremity 16 of a clip is adapted to extend as shown in Figure 2. This arrangement is such that the clip can resiliently engage against the shoulder afforded by the bead 34 when the cover is on the wheel.

The cover may be further reinforced by providing the central flange 26 with a corrugation or rib 35.

Also the central crown portion 24 of the outer cover element 21 may be indented as at 40 to provide an emblem area similar to that used on hub caps of an automobile.

Now from the foregoing it is clear that my novel cover is provided with a double thickness outer annular portion which extends over the junction of the rim and body parts of the wheel, yet is out of contact with the rim. This is advantageous in that the cover does not have to take into consideration any variations in the location of the rim relative to the body part. Moreover when it is on the wheel it is only bottomed against the body part and more particularly on the nose portion 12 of the body part.

From the nose portion of the body part the two elements going to make up the nested cover are separated and diverged as described hereinabove. This arrangement enables the ornamentation of the central part of the cover and at the same time provides the rear part of the cover with a retaining skirt for cooperation with the spring clips on the wheel.

In the application of the cover to the wheel an opening 41 in the outer annular portion (Figure 1) is first aligned with the usual valve stem 42 of the tire and tube assembly and the openings 36 are brought opposite the spring clips 15. Thereafter, upon the cover being pressed axially towards the wheel the spring clips are deflected radially inwardly by the edge 34 until this edge 34 passes over the humps 16 of the clips and behind the same as shown in Figure 2. Inward axial movement of the cover on the wheel is limited by the cover bottoming against the nose portion 12 of the wheel body.

The modification of Figure 4 is substantially like the first form, with the exception that the outer portion of the cover 20' does not have a double thickness of material.

In this cover 20', as in the first embodiment, the converging portions 23' and 24', corresponding to portions 23 and 24 of Figure 2, terminate at a shoulder 27' resting on a flange 28' of the rear ring. Actually, the shoulder 27' is welded to the ring-like flange 28' at 50, so that the ring and main body of the cover 20' are integral.

The outer edge of the flange 28' is turned toward and abuts the rear side of the cover portion 23'. The radially inner portion of flange 28' is turned axially rearwardly and is formed into a multiple thickness annular bead or shoulder 34' identical to the shoulder or bead 34.

The central portion 36' of this rear flange ring is apertured and is of exactly the same configuration as the central portion of the element 22 shown in Figure 3.

With the exception of the omission of the double thickness of material in cover portion 23' this form of the cover is identical to the first form and functions and operates in the same way.

It should be noted that in forming the beads or shoulders 34—34' in the covers, a portion of the cover is first bent into a double thickness or turned flange and then the double-thickness flange is turned back upon itself into a double fold, thereby providing each shoulder or bead with three thicknesses of material. This provides the cover with a greatly reinforced backing portion adapted to bottom against the nose portion of the body of the wheel. Furthermore, the double folded reinforcing shoulder 34 rigidly withstands the action of the spring clips 15 in applying and removing the cover, the axially inner side of the reinforcing shoulder presenting a rounded surface for camming engagement by the clips when the cover is pressed into position on the wheel.

I claim as my invention:

1. In a wheel structure including a multiflanged tire rim and a body part provided with cover retaining spring clips, a cover comprising a circular member including an outer radial annular portion for disposition over the junction of the tire rim and body part and a central dished portion forming a hub covering part, the junction of said portions comprising an axially inwardly dished shoulder and a rear ring secured to said circular member and contiguous with said shoulder, the central portion of said ring radially inwardly of said shoulder being apertured to permit the spring clips to extend therethrough and being provided with an integral turned multiple thickness bead comprising at least three layers of material at the apertured portion and engageable by the spring clips for the detachable retention of the cover on the wheel.

2. In a vehicle wheel structure including a wheel body having an annular outwardly projecting nose bulge, with retaining clips located on the wheel radially inwardly of the nose bulge, a cover element having an angular cross section defining a seat engageable with the nose bulge to maintain the cover in centered relation on the wheel and including a generally radially inwardly extending flange, said flange having a double folded annular reinforcing shoulder adjacent to said seat and a plurality of retaining clip openings therein at the radially inner side of said shoulder for passage of the clips through the flange and into engagement with said reinforcing shoulder to retain the cover on the wheel.

3. A vehicle wheel cover adapted for disposition at the outer side of a wheel, said cover having a portion thereof extending generally axially inwardly and adapted to fit within the perimeter of a depressed portion of a wheel, said portion including a radially inwardly extending flange having a plurality of openings adapted to receive retaining spring clips therein, said openings being defined at their radially outer margin by a double folded reinforcing shoulder.

4. A vehicle wheel cover adapted for disposition at the outer side of a wheel, said cover having a portion thereof extending generally axially inwardly and adapted to fit within the perimeter of a depressed portion of a wheel, said portion including a radially inwardly extending flange having a plurality of openings adapted to receive retaining spring clips therein, said openings being defined at their radially outer margin by a double folded reinforcing shoulder, and a second cover member carried by said first cover member and concealing said flange.

5. A vehicle wheel cover adapted for disposition at the outer side of a wheel, said cover having a portion thereof extending generally axially inwardly and adapted to fit within the perimeter of a depressed portion of a wheel, said portion including a radially inwardly extending flange having a plurality of openings adapted to receive retaining spring clips therein, said openings being defined at their radially outer margin by a double folded reinforcing shoulder, and a second cover member carried by said first cover member and concealing said flange, said second cover member comprising divergent outer annular and inner circular portions and the first mentioned cover member comprising a ring secured to the second cover member at the axially inner side of the juncture of the portions of the second cover member.

6. In a wheel structure including a multi-flange tire rim and a wheel body supporting the tire rim and having an axially outwardly projecting annular reinforcing nose bulge with a depressed central bolt-on flange and retaining clips carried by the bolt-on flange and having cover retaining portions directed generally toward said nose bulge, a cover including a portion arranged for substantially concealing the tire rim and the adjacent portion of the wheel body radially outwardly of the nose bulge and a second portion for concealing the central portion of the cover and a third portion comprising an angular annular seat generally complementary to an engageable with the nose bulge to maintain the cover in centered relation and to hold said one portion of the cover in spaced relation to the tire rim, said third portion including a generally radially inwardly extending flange having a series of apertures therethrough for accommodating the retaining clips therethrough, said flange being double folded upon itself to provide an annular reinforcing shoulder at the radially outer side of the clip apertures and engageable by the clips for retaining the cover on the wheel.

GEORGE ALBERT LYON.

REFERENCES CITED

The following references are of record in the file of this patent:

UNITED STATES PATENTS

| Number | Name | Date |
| --- | --- | --- |
| 2,031,092 | Begg | Feb. 18, 1936 |
| 2,190,669 | Lyon | Feb. 20, 1940 |
| 2,401,492 | Lyon | June 4, 1946 |

FOREIGN PATENTS

| Number | Country | Date |
| --- | --- | --- |
| 760,208 | France | Feb. 19, 1934 |